United States Patent
Leboeuf

(10) Patent No.: US 7,116,839 B2
(45) Date of Patent: Oct. 3, 2006

(54) OPTICAL MEASUREMENT OF VANE RING THROAT AREA

(75) Inventor: Pierre Leboeuf, St. Antoine sur Richelleu (CA)

(73) Assignee: Pratt & Whitney Canada Corp., Longueuil (CA)

( * ) Notice: Subject to any disclaimer, the term of this patent is extended or adjusted under 35 U.S.C. 154(b) by 708 days.

(21) Appl. No.: 10/270,506

(22) Filed: Oct. 16, 2002

(65) Prior Publication Data

US 2003/0228069 A1    Dec. 11, 2003

(30) Foreign Application Priority Data

Jun. 6, 2002    (CA) .................................... 2389484

(51) Int. Cl.
*G06K 9/36*    (2006.01)
(52) U.S. Cl. ...................... 382/286; 382/152; 415/115; 415/164; 356/625
(58) Field of Classification Search ................ 382/152, 382/286; 415/115, 160, 164, 914, 211.1; 122/392; 126/299 D; 60/608; 356/615, 356/623, 625; 250/559.22
See application file for complete search history.

(56) References Cited

U.S. PATENT DOCUMENTS

| | | | |
|---|---|---|---|
| 4,222,172 A | 9/1980 | Mason | |
| 4,582,426 A | 4/1986 | Douglas | |
| 4,875,777 A | 10/1989 | Harding | |
| 4,896,430 A * | 1/1990 | Burton | ........................ 33/552 |
| 4,983,043 A | 1/1991 | Harding | |
| 5,186,404 A * | 2/1993 | Wark | ........................... 241/119 |
| 5,332,357 A * | 7/1994 | Tubbs | ........................ 415/160 |
| 5,517,310 A | 5/1996 | Paquette | ..................... 356/615 |
| 5,620,301 A * | 4/1997 | Lawer | ......................... 415/150 |
| 5,630,701 A * | 5/1997 | Lawer | ........................ 415/160 |
| 5,931,636 A * | 8/1999 | Savage et al. | .............. 415/115 |
| 6,094,269 A | 7/2000 | Ben-Dove et al. | .......... 356/623 |
| 6,148,677 A | 11/2000 | Evangelista | |
| 2004/0239948 A1 | 12/2004 | Harding et al. | |

FOREIGN PATENT DOCUMENTS

| | | |
|---|---|---|
| JP | 61176806 | 8/1986 |
| JP | 62182604 | 8/1987 |
| JP | 05087534 | 4/1993 |

* cited by examiner

*Primary Examiner*—Sheela Chawan
(74) *Attorney, Agent, or Firm*—Ogilvy Renault LLP

(57) ABSTRACT

A method and device for optically measuring throat area in a vane ring for a gas turbine engine, the method according to one aspect of the invention following the steps of: placing the vane ring on a fixture with the periphery of each throat within an optical measuring field of view; positioning a primary radiation source to cast an area of shadow on the vane ring delineating the throat as a dark area surrounded by an area of reflectance; capturing an image of the dark area with a radiation detector; analyzing the image to acquire a dimensional data of the dark area, proportional to the absolute value of throat dimensions; progressively capturing and analyzing images from each of the individual throats; then processing and calibrating the dimensional data of each image to account for scaling and viewing direction (perspective distortion) to acquire an absolute value for the composite throat area of the vane ring.

46 Claims, 5 Drawing Sheets

OPTICAL MEASUREMENT OF VANE RING THROAT AREA

TECHNICAL FIELD

The invention relates to a method of optically measuring the throat area of a vane ring for a gas turbine engine, by irradiating or illuminating the vanes and shrouds bounding a selected throat, then measuring the resulting shadow area which corresponds with the throat area and repeating the process for each throat in a vane ring to determine the total vane ring throat area.

BACKGROUND OF THE ART

The invention relates to a method and a device for measuring the flow area at the point of maximal restriction in a gas flow passage, in particular for measuring the vane or nozzle area of a gas turbine engine.

Stators, also known as vane rings, are an array of stationary airfoils that are used to change the direction of an annular airflow as it approaches or departs from an array of rotating blades on a turbine or compressor rotor for example. In order to change the minimum flow area through a stator vane ring, adjustments to the trailing edge angle of stator vane blades are made. The minimum flow area is determined by the distance between a vane trailing edge and the next vane's pressure side, and so changing the trailing edge angle changes the minimum flow area. The minimum flow area controls the pressure ratio of the turbine and the mass flow of the engine, and therefore the compressor's running line.

In a new engine the process of tuning the stator to the rotor is relatively simple since the rotating blades are exactly the same. However, as the engine wears and is overhauled, the stator airfoils must be individually adjusted to retune the stator to achieve optimal engine performance. These adjustments may involve simply bending the trailing edge of a stator airfoil, cutting back the trailing edge or in the case of a segmented vane ring, vane segment replacement. However, generally hundreds of minute bends or adjustments must be performed around the stator ring, which accumulate to affect the flow area of the stator.

To calibrate the stator ring relative to the gas turbine engine, the flow area of the stator must be determined. A change in the stator flow area changes the compressor running line, which effects gas generator speed, compressor pressure ratio, temperature, mass flow at constant power and engine surge margin in a transient regime. At constant power, increasing the power turbine stator flow area while maintaining a constant compressor turbine stator flow area increases gas generator speed and mass flow but decreases the compressor pressure ratio slightly. Therefore, vane matching based on effective flow area is a critical engine overhaul procedure for predicting optimum engine performance and achieving optimum efficiency and energy consumption.

Conventionally, the flow area of a stator ring can been determined by use of a sonic flow rig as for example shown in U.S. Pat. No. 6,148,677 to Evangelista. The flow rig simulates the behaviour of the engine and comprises a wind tunnel set up that measures the pressure drop of an airflow as air passes through the stator ring in a controlled experimental environment. A flow rig may be precalibrated so that a known flow area results in a known pressure drop. Measuring the pressure drop across a particular stator ring therefore can be used to calculate the approximate flow area of that stator ring.

Standard flow rigs require significant set up and the time required to run the flow ring is approximately 45–60 minutes. As well, although flow rigs provide reliable results when stator blades are relatively new and regular, once a worn stator is used with rework or adjustments made to the leading or trailing edges, local pressure effects create significant inaccuracies. In cases where the stator ring has been refurbished, subjected to wear and tear, or has been adjusted excessively, conventional gas flow area measurement with comparator methods are unreliable. A stator ring is an extremely expensive component and therefore an accurate reliable means of measuring the flow area is required.

Another conventional method of determining the flow area of the stator ring involves mechanically measuring the dimensions of the throat area. U.S. Pat. No. 4,222,172 to Mason describes a vane area measurement device using a dial gauge mounted in a specialized fixture to measure the dimension of the throat area. Coordinate measuring machines (CCM) can also trace the area mechanically and calculate the enclosed area which represents the vane throat area.

Mechanical measuring devices may be imprecise, slow and relatively expensive. Coordinate measuring machines currently use two measurement methods to determine throat area. One method measures the throat opening width at three sections and measures the height to obtain the throat area. The first method is imprecise where the trailing edge is irregular between the measured sections. The second method traces the throat opening with a probe without breaking contact. The probe traces the opening at a predetermined axial distance from the airfoil stacking line, the reference axis of the airfoil. The throat area value calculation assumes that the chord length is constant and that there is no profile deviation between the path traced and the actual trailing edge. However, deviations are common in all but new parts since vane adjustments, refurbishment and normal wear cause profile deviation, chord length deviation or both. The distance between the probe tracing path and the trailing edge may be between 0.050–0.100 inches whereas profile deviation may extend to 0.300–0.400 inches from the trailing edge. Therefore the deviations are not entirely missed by the tracing probe, although a degree of error is introduced.

It is an object of the present invention to provide a fast, inexpensive and reliable method of calculating the throat area of a vane ring.

It is a further object of the invention to utilize optical measurement of the vane ring throat area to avoid the innaccuracy of prior art mechanical and airflow measurement methods.

Further objects of the invention will be apparent from review of the disclosure, drawings and description of the invention below.

DISCLOSURE OF THE INVENTION

The invention provides a method and device for optically measuring throat area in a vane ring for a gas turbine engine following the steps of: placing the vane ring on a fixture with the periphery of each throat within an optical measuring field of view; positioning a primary radiation source to cast an area of shadow on the vane ring delineating the throat as a dark area surrounded by an area of reflectance; capturing an image of the dark area with a radiation detector; analyzing the image to acquire a dimensional data of the dark area, proportional to the true throat dimensions; progressively capturing and analyzing images from each of the individual throats; then processing and calibrating the dimensional data of each image to account for scaling and viewing direction (perspective distortion) to acquire a true value for the composite throat area of the vane ring.

In the preferred embodiment, the source of radiation is light in the visible, infrared, or ultraviolet spectrum since these are easily and safely utilized in most environments. The optical measuring method is very fast requiring only 25 to 30 seconds for a very accurate measurement that accounts for modifications to the stator vane trailing edges, is easily repeatable, inexpensive and avoids unnecessary scraping of older vane arrays that usually provide inaccurate results if prior art methods are utilized. Leading edge profile deviations significantly effect conventional flow comparator methods but do not affect the engine. It is an advantage of the present method, which views the trailing edge only, that leading edge profile deviations do not lead to inaccuracies in the measurement of vane ring throat area.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
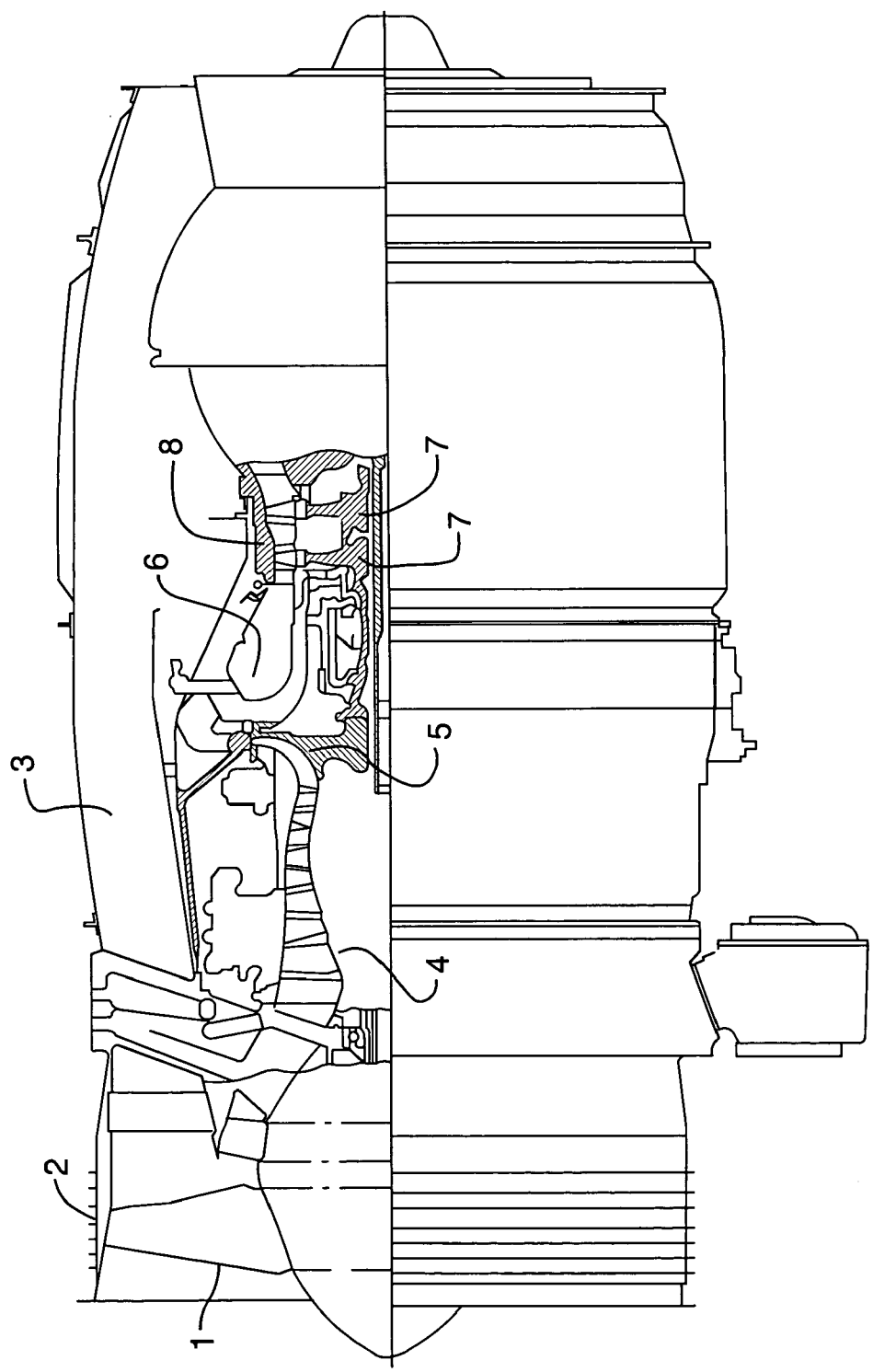
FIG. 1 is an axial cross-sectional view through a turbo fan engine to indicate the usual location of stator vane rings adjacent turbine rotors and compressor rotors.
Figure 2:
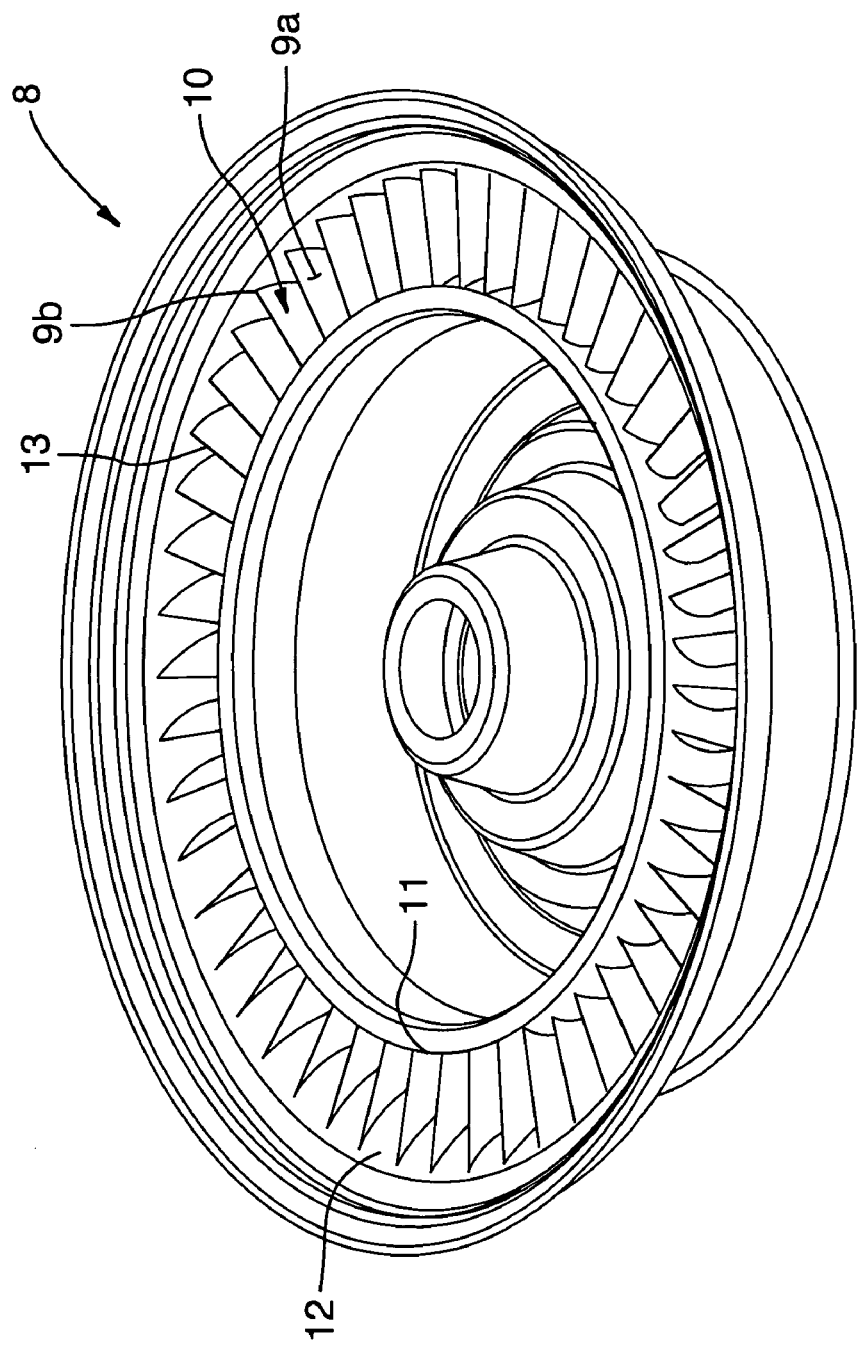
FIG. 2 is a perspective view of a single vane ring showing the trailing edges of an array of stator vanes confined between an inner and an outer shroud.

FIG. 1 shows a typical axial cross-sectional view through a turbofan engine, although the invention is equally applicable to turbo shaft and turboprop engines. Intake air passes over rotating fan blades 1 within the fan casing 2 and is split into a bypass flow that progresses through bypass duct 3 and the internal engine core. The internal portion of the airflow passes through low-pressure axial compressor 4 and centrifugal compressor 5 into the combustor 6. Fuel is injected and ignited within the combustor 6 and hot gases pass over turbines 7 to be ejected through the rear exhaust portion of the engine FIG. 2 illustrates a perspective view of a single vane ring 8 that is conventionally disposed upstream of the turbines 7 or upstream of compressor turbines in an axial flow compressor 4.

Figure 5:
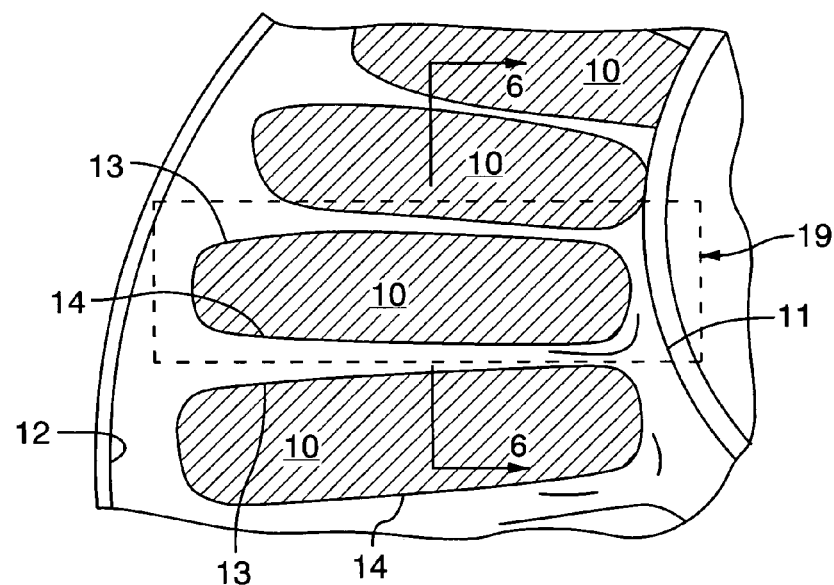
FIG. 5 is a perspective view as seen by the camera showing the area of shadow corresponding to the throat area surrounded by an area of illumination.
Figure 6:
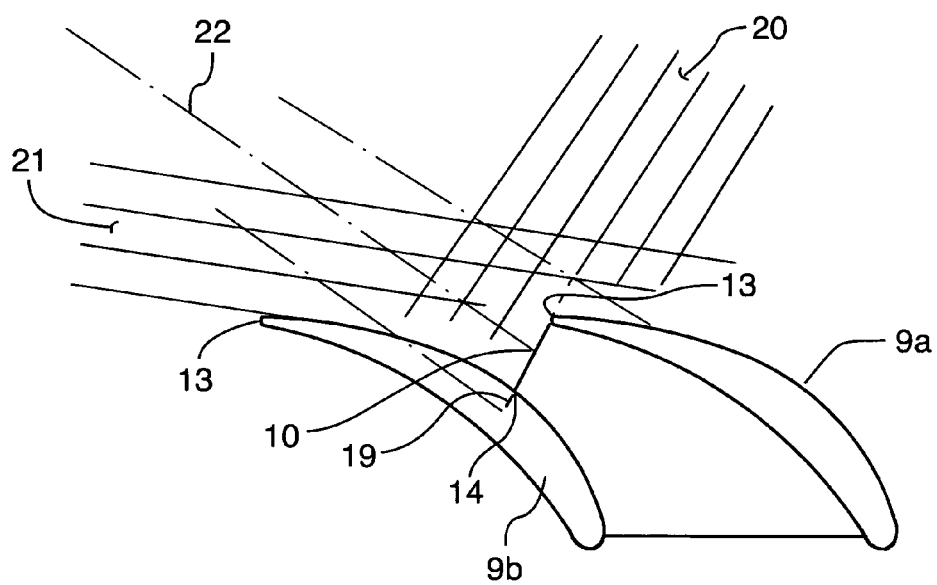
FIG. 6 is a sectional view along lines 6—6 of FIG. 5 showing the primary and auxiliary light sources similar to that of FIG. 3 with the field of view of the camera indicated as a rectangle capturing an image of the area of shadow representing the throat area between the stator vanes.

The vane ring 8 has an annular array of stator vanes 9 that define a plurality of individual throats 10 between each set of adjacent vanes 9. The detailed views in FIG. 5 and FIG. 6 illustrate the individual vane throats 10 as a dark area of shadow surrounded by an area of illumination created by means described below. Each individual throat 10 (as best seen in FIG. 6) is a planar opening with a periphery bounded in a radial direction by an inner vane shroud 11 and an outer vane shroud 12. The individual vane throat 10 has a periphery bounded in the circumferential direction by the trailing edge 13 of the leading vane 9a and a projected co-planar line 14 on the convex surface of the adjacent following vane 9b.

Figure 3:
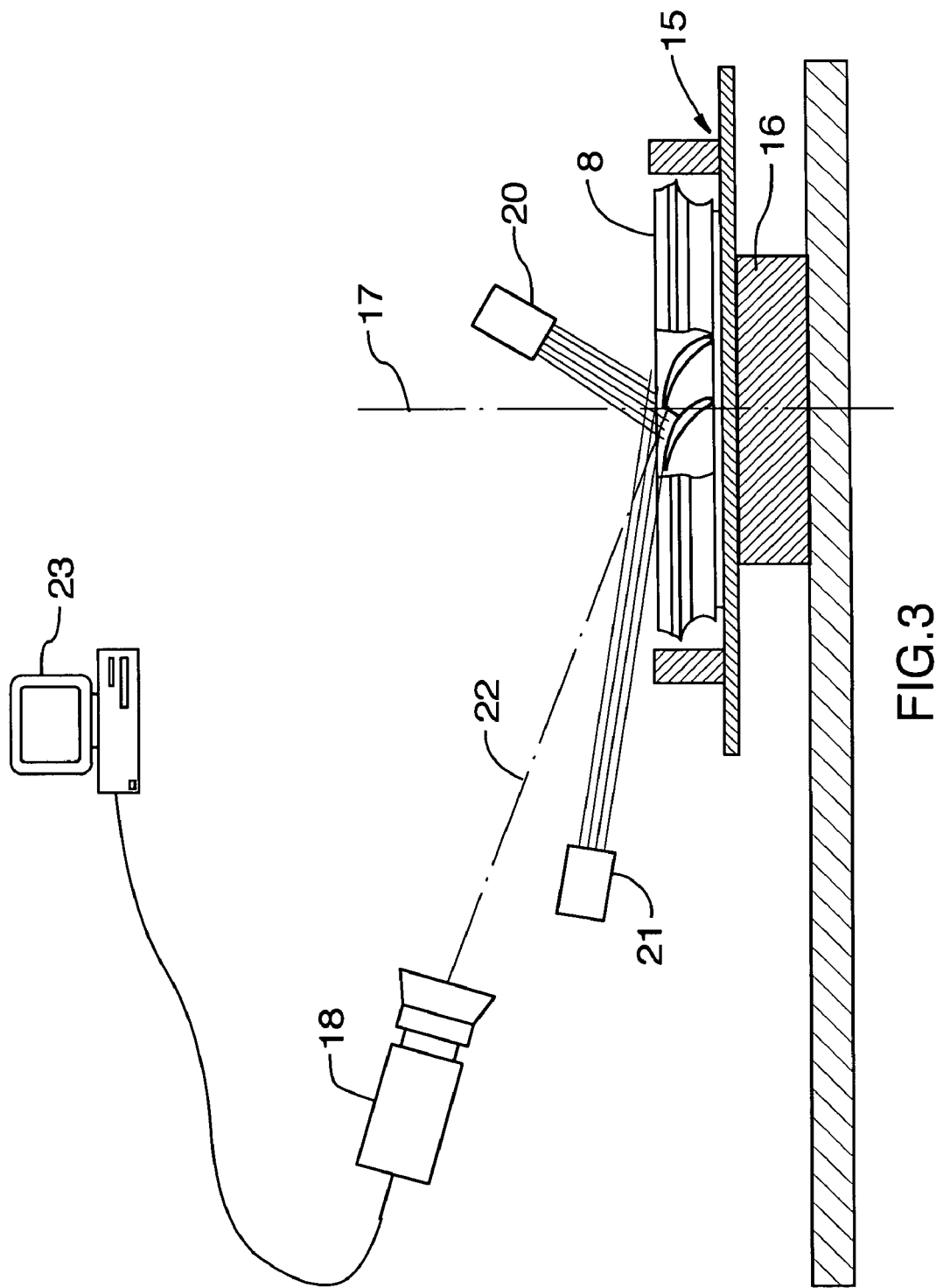
FIG. 3 is an elevation sectional view of a device according to the invention showing a partial cross-sectional view through the stator vane mounted on a rotary fixture with primary and auxiliary light sources creating an area of shadow surrounded by an area of illumination to visually depict the throat area which is viewed by an optical camera.
Figure 4:
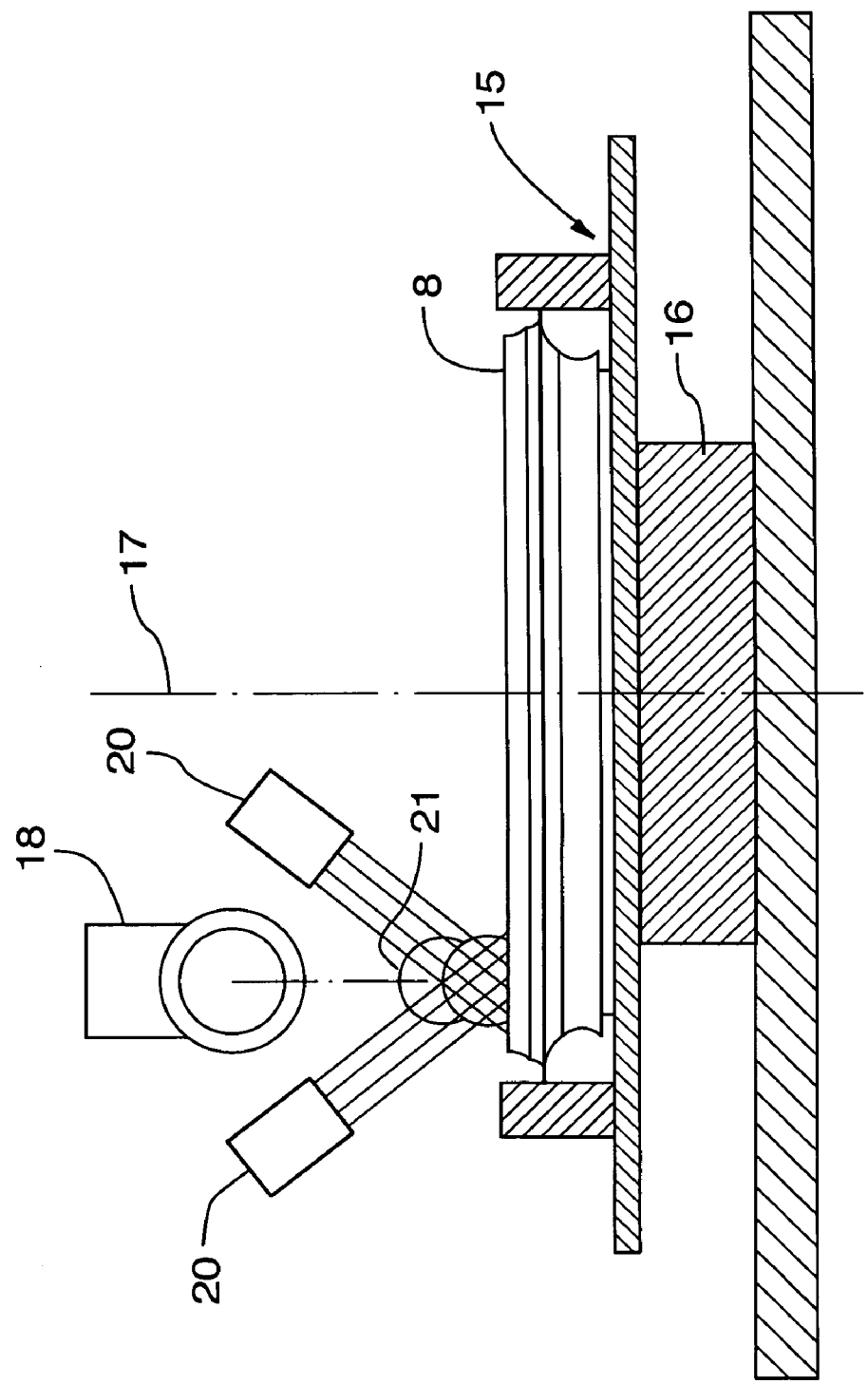
FIG. 4 shows an elevation view along a plane perpendicular to that of FIG. 3 showing the primary illumination sources and camera(s).

The method of the invention commences with the following steps as illustrated in FIGS. 3 and 4. The vane ring 8 is placed on a fixture 15 preferably with a rotary indexing table 16 so that the ring 8 can be progressively rotated about axis 17 to progressively capture images for each individual throat and then collect and process the data to obtain a composite throat area for the entire ring 8.

As shown in FIGS. 3 and 4, the vane ring 8 is placed in the fixture 15 in an imaging position such that the periphery of a selected individual throat 10 is within the optical measuring field of view of camera 18. FIGS. 5 and 6 illustrate the optical measuring field of view as a rectangular plane 19. It will be understood that any shape of the field of view may be used and multiple cameras 18 may be employed. Cameras 18 may each measure a defined portion of the throat area which is then summed to obtain a total, or each camera may measure the entire throat and results are averaged, to improve accuracy.

As shown in FIGS. 3 and 4, two primary radiation sources 20 are disposed in a throat defining position to cast an area of shadow (as best seen in FIGS. 5 and 6) on the vane ring 8 initiating in the plane of the selected throat 10. As indicated in FIGS. 5 and 6, the area of shadow is surrounded by an area of reflectance thereby visually delineating the throat area.

In order to provide as superior delineation especially of the trailing edge 13, an auxiliary radiation source 21 is positioned to illuminate the trailing edge of the leading vane 9a. In order to optimize the contrast between the areas of reflectance and areas of shadow, the primary radiation sources 20 are adjusted by the operator. Preferably, the primary radiation source 20 and auxiliary radiation source 21 are collimated for improved accuracy. Collimated light sources produce little or no diffusion of light rays around the edges of an illuminated area.

Although the radiation sources 20 and 21 can be of any known radiation type, for safety and ease of use radiation within the light spectrum is preferred and may be chosen from visible light, infrared light or ultraviolet light to equal advantage. Further, the radiation sources 20 and 21 may provide a pattern or radiation having a low intensity portions contrasted with high intensity portions to improve detection by the camera 18. For example, a checkered pattern of radiation or straight lined pattern of radiation may improve detection of the contrasting areas of shadow and illumination in certain circumstances.

Further, in the embodiment illustrated in FIGS. 3, 5 and 6, the viewing direction 22 of the camera 18 is shown as being perpendicular to the plane of the selected throat 10 (depicted in the illustrations as the plane of field of view 19). The preferred viewing direction 22 is from slightly above a perpendicular orientation to more precisely define the lower boundary of the shadow (along line 14 of FIG. 6).

With the vane ring 8 positioned in the fixture 15 in the imaging position shown with the periphery of the individual throat 10 within the optical measuring field of view 19, the operator can proceed to capture an image of a portion of the vane ring as shown in FIGS. 5 and 6 within the field of view 19 with the camera 18 or other radiation detector to suit the radiation sources 20 and 21. The light or radiation sources 20, 21 should have a broad enough area to illuminate a sufficient area around the throat 10 opening to ensure a good contrast all around the throat 10 opening and preferably any light source is collimated or near collimated.

Where radiation in the form of light sources 20 and 21 are utilized, the image can be analized by pixel counting to acquire dimensional data of the dark portion of the image which is proportional to the individual throat area of the selected throat 10.

Where an accurate composite throat area for the vane ring 8 is required, the method can proceed to progressively capture and analyze images from each of the individual throats 10 and then process the dimensional data for each image to acquire a composite throat area for the entire vane ring 8.

However, in some circumstances an estimated value for the approximate throat area is adequate. In such case, the method may include progressively capturing and analysing selected images from a selected plurality of individual throats 10. An estimate for the approximate throat area for the entire vane ring 8 can be obtained by prorating the dimensional data for the selected images over the entire vane ring 8.

An absolute value for the actual throat area in the plane of the selected throat 10 (plane shown as rectangular field of view 19 in FIGS. 5 and 6) may be obtained by calibrating the dimensional data applying at least one scaling factor to the dimensional data obtained. Since the camera 8 is positioned at a distance from the vane ring 8, it is normally necessary even when the field of view 19 is perpendicular to the viewing direction 22 to provide a scaling factor to obtain and actual measure of throat area for the vane ring 8. In the event however that the viewing direction 22 is not perpendicular to the plane, of the vane throat 10 (illustrated as rectangular plane 19) a first scaling factor may be applied to the radial dimension of the data and a second scaling factor applied to the circumferential dimension of the data obtained. The image data may be transmitted to a computer 23 for analysing the image data and obtaining throat area for each individual throat 10 or acquiring the composite throat area for the entire vane ring as the fixture 10 is progressed in a rotary fashion.

More complex calibration or scaling of the image analysis may be applied to compensate for lens distortion and image perspective. The system is initially calibrated by imaging a known grid or pattern of holes located at the same distance and orientation as the throat area 10 to be measured.

A secondary calibration involves using master vane rings having a known vane throat area for each manufactured model. The optical measurement method described above is performed on each master vane to calibrate the optical measuring system and to establish a calibration curve against which measured values are compared to determine the actual vane throat area.

Although the above description relates to a specific preferred embodiment as presently contemplated by the inventor, it will be understood that the invention in its broad aspect includes mechanical and functional equivalents of the elements described herein.

I claim:

1. A method of optically measuring throat area in a vane ring for a gas turbine engine, the vane ring having an annular array of vanes defining a plurality of individual throats between adjacent leading and following vanes of the array, each said individual throat being a planar opening with a periphery bounded in a radial direction by an inner vane shroud and an outer vane shroud and bounded in a circumferential direction by a trailing edge of the leading vane and a projected co-planar line on a convex surface of the adjacent following vane, the method comprising:

placing the vane ring on a fixture in an imaging position wherein the periphery of a selected individual throat is within an optical measuring field of view;

positioning at least one primary radiation source in a throat defining position wherein an area of shadow is cast by said primary radiation source on the vane ring initiating in the plane of the selected throat, said area of shadow being surrounded by an area of reflectance;

capturing at least one image of a portion of the vane ring within the field of view with a radiation detector; and analyzing each image to acquire a dimensional data of a dark portion of each image proportional to an individual throat area of the selected throat.

2. A method according to claim 1 including:

progressively capturing and analyzing images from each of the individual throats; and processing the dimensional data of each image to acquire a composite throat area for the vane ring.

3. A method according to claim 1 including:

progressively capturing and analyzing selected images from a selected plurality of the individual throats; and estimating an approximate throat area for the vane ring by prorating the dimensional data of said selected images over the vane ring.

4. A method according to claim 1 wherein the primary radiation source is collimated.

5. A method according to claim 1 wherein the primary radiation source projects light of a spectrum selected from the group consisting of: visible; infrared; and ultraviolet.

6. A method according to claim 1 wherein the primary radiation source projects a pattern of radiation having high intensity and low intensity portions.

7. A method according to claim 1 including:

calibrating the dimensional data to determine the throat area of the selected throat by comparing the dimensional data to dimension data acquired from a master vane ring having a known throat area.

8. A method according to claim 1 including:

calibrating the dimensional data to determine the throat area in the plane of the selected throat by applying at least one scaling factor to the dimensional data.

9. A method according to claim 8 including:

applying a first scaling factor to a first dimension of the data and a second scaling factor to a second dimension of the data, where the plane of the selected throat and a viewing direction of the radiation detector are non-perpendicular.

10. A method according to claim 1 including analyzing the image by pixel counting.

11. A method according to claim 1 including:

illuminating the trailing edge of the leading vane with an auxiliary radiation source.

12. A method according to claim 11, wherein the auxiliary source radiates visible light.

13. A method according to claim 11, wherein the primary radiation source is disposed on a same side of the vane ring as the radiation detector.

14. A method according to claim 1 including:
illuminatig the trailing edge of the following vane with an auxiliary radiation source to reduce undesirable shadow on the following vane.

15. A method according to claim 1 including
adjusting the primary radiation source to optimize contrast between areas of reflectance and shadow.

16. A method according to claim 1 wherein the fixture includes a rotary indexing table.

17. A method according to claim 1, wherein two primary radiation sources are provided.

18. A method according to claim 17, wherein the primary radiation sources radiate visible light.

19. A method according to claim 1, wherein the radiation detector includes at least one camera.

20. A method according to claim 1, wherein the radiation detector field of view is directed generally perpendicularly to the plane of the selected throat.

21. A method according to claim 20, wherein the radiation detector field of view is slightly off of perpendicular alignment to thereby facilitate image capture of the area of shadow in a vicinity corresponding to said projected coplanar line.

22. A device for optically measuring throat area in a vane ring for a gas turbine engine, the vane ring having an annular array of vanes defining a plurality of individual throats between adjacent leading and following vanes of the array, each said individual throat being a planar opening with a periphery bounded in a radial direction by an inner vane shroud and an outer vane shroud and bounded in a circumferential direction by a trailing edge of the leading vane and a projected co-planar line on a convex surface of the adjacent following vane,
the device comprising:
fixture means for holding the vane ring in an imaging position wherein the periphery of a selected individual throat is within an optical measuring field of view;
a primary radiation source disposed in a throat defining position wherein an area of shadow is cast by said primary radiation source on the vane ring initiating in the plane of the selected throat, said area of shadow being surrounded by an area of reflectance;
radiation detector means for capturing an image of a portion of the vane ring within the field of view; and
image analyzing means for analyzing the image to acquire a dimensional data of a dark portion of the image proportional to an individual throat area of the selected throat.

23. A device according to claim 22,
wherein the fixture includes a rotary indexing table; and
the device further includes
dimensional data processing means for processing the dimensional data of each image to acquire a composite throat area for the vane ring.

24. A method of optically measuring throat area of a gas turbine engine vane ring, the vane ring having an annular array of vanes defining a plurality of throats between adjacent leading and following vanes of the array, each said throat being a planar opening with a periphery bounded in a radial direction by an inner vane shroud and an outer vane shroud and bounded in a circumferential direction by a trailing edge of the leading vane and a projected co-planar line on a convex surface of the adjacent following vane, the method comprising the steps of:
using a fixture to position a selected throat of the vane ring in an imaging position;
radiating light onto the vane ring to define the selected throat as an area of reflectance surrounding an area of shadow;
capturing at least one image of the selected throat; and
analyzing the image to acquire dimensional data of a dark portion of the image proportional to a throat area of the selected throat.

25. A method according to claim 24 further comprising the steps of measuring throat areas of a plurality of throats of the vane ring; and then using the result to acquire a total throat area for the vane ring.

26. A method according to claim 24 wherein the radiated light is collimated.

27. A method according to claim 24 wherein the radiated light is visible light.

28. A method according to claim 24 wherein light is radiated in a pattern having high intensity and low intensity portions.

29. A method according to claim 24 further comprising the step of calibrating the dimensional data to determine the throat area of the selected throat by comparing the dimensional data to dimensional data acquired from a master vane ring having a known throat area.

30. A method according to claim 24 wherein the image is analyzed by pixel counting to acquire said dimensional data.

31. A method according to claim 24 further comprising the step of calibrating the dimensional data to determine the throat area in the plane of the selected throat by applying at least one scaling factor to the dimensional data.

32. A method according to claim 31 including applying at least one scaling factor to compensate for perspective distortion of the image due to the radiation detector having a viewing direction non-perpendicular to the selected throat.

33. A method according to claim 24 wherein light is radiated onto the inner vane shroud, the outer vane shroud, the trailing edge of the leading vane and the convex surface of the adjacent following vane to thereby define the selected throat.

34. A device for optically measuring throat area in a vane ring for a gas turbine engine, the vane ring having an annular array of vanes defining a plurality of individual throats between adjacent leading and following vanes of the array, each said individual throat being a planar opening with a periphery bounded in a radial direction by an inner vane shroud and an outer vane shroud and bounded in a circumferential direction by a trailing edge of the leading vane and a projected co-planar line on a convex surface of the adjacent following vane, the device comprising:
a fixture adapted to hold the vane ring in an imaging position wherein the periphery of a selected individual throat is within an optical measuring field of view;
p'radiation means disposed in a throat defining position for illuminating the vane ring such that an area of reflectance bounds an area of shadow on the vane assembly which thereby visually delineates a throat area of the selected throat;
a radiation detecting apparatus for capturing at least one image of a the vane ring within the field of view; and
an image analyzing apparatus for analyzing the at least one image to acquire a dimensional data of a dark portion of the image proportional to the throat area of the selected throat.

35. A device according to claim 34, wherein the primary radiation source is disposed on a same side of the vane ring as the radiation detector.

36. A device for optically measuring throat area in a vane ring for a gas turbine engine, the vane ring having an annular array of vanes defining a plurality of individual throats between adjacent leading and following vanes of the array, each said individual throat being a planar opening with a periphery bounded in a radial direction by an inner vane shroud and an outer vane shroud and bounded in a circumferential direction by a trailing edge of the leading vane and a projected line on a convex surface of the adjacent following vane, the line co-planar with the planar opening, the device comprising:

at least one camera having a field of view;

a fixture adapted to position a selected throat in an imaging position such that the periphery of the throat is within the field of view of the camera;

a first radiation source positioned to cast collimated light on the vane ring to delineate the selected throat as an area of reflectance surrounding a shadow area;

a second radiation source positioned to cast collimated light on said trailing edge; and an apparatus adapted to receive at least one image of the throat area from the camera and acquire therefrom dimensional data of a dark area of the image representative of the throat area.

37. A device according to claim 36, wherein the radiation sources radiate visible light.

38. A device according to claim 36, wherein the camera's field of view is directed perpendicularly to the plane of the selected throat opening.

39. A device for optically measuring a throat area defined between adjacent vanes of an annular vane array, the throat area having a planar opening defined by an inner shroud, an outer shroud, a trailing edge of one of the adjacent vanes and a line projected onto a convex surface of the other of the adjacent vanes, the line being co-planar with the throat opening, the device comprising;

at least one optical radiation detector having a field of view;

a fixture adapted to position the vane array in an imaging position such that the periphery of the throat is within the field of view of the optical radiation detector;

at least two radiation sources positioned to radiate light on the vane array to visually delineate the throat area with an area of reflectance surrounding a shadow area corresponding to the opening of the throat area;

an apparatus adapted tO receive at least one image of the throat area from the optical radiation detector and acquire therefrom dimensional data of a dark portion of the image representative of the throat area.

40. A device accordihg to claim 39, wherein the radiation sources comprise collimated visible light sources.

41. A device according to claim 40, wherein one of the two visible light sources is positioned radially inward of the inner shroud of the annular vane array, and the other light source is positioned radially outwardly of the inner shroud of the annular vane array.

42. A device according to claim 39, wherein at least one of the radiation sources is directed parallel to the plane of throat area opening.

43. A device according to claim 39, wherein at least one of the radiation sources is positioned to illuminate said vane trailing edge.

44. A device according to claim 39, wherein the optical radiation detector includes at least one camera.

45. A device according to claim 39, wherein the optical radiation detector field of view is aligned generally perpendicularly to the plane of the selected throat.

46. A device according to claim 45, wherein the optical radiation detector field of view is positioned slightly off perpendicular alignment to thereby facilitate image capture of and area in a vicinity of the line projected onto the convex surface.

* * * * *

UNITED STATES PATENT AND TRADEMARK OFFICE
CERTIFICATE OF CORRECTION

PATENT NO. : 7,116,839 B2  Page 1 of 1
APPLICATION NO. : 10/270506
DATED : October 3, 2006
INVENTOR(S) : Pierre Leboeuf It is certified that error appears in the above-identified patent and that said Letters Patent is hereby corrected as shown below:

In the claims:

claim 34, column 8, line 52, delete "p'radiation" and insert --radiation--

Signed and Sealed this

Nineteenth Day of December, 2006

JON W. DUDAS
*Director of the United States Patent and Trademark Office*